(12) United States Patent
Cunliffe et al.

(10) Patent No.: US 8,075,443 B2
(45) Date of Patent: Dec. 13, 2011

(54) PLANETARY GEAR SET

(75) Inventors: Frank Cunliffe, Chipping Campden (GB); Raymond John Hicks, Llangammarch Wells (GB)

(73) Assignee: Orbital2 Limited, Chipping Campden, Gloucestershire (GB)

( * ) Notice: Subject to any disclaimer, the term of this patent is extended or adjusted under 35 U.S.C. 154(b) by 831 days.

(21) Appl. No.: 12/065,962

(22) PCT Filed: Sep. 4, 2006

(86) PCT No.: PCT/GB2006/003255
§ 371 (c)(1),
(2), (4) Date: Jun. 4, 2008

(87) PCT Pub. No.: WO2007/028965
PCT Pub. Date: Mar. 15, 2007

(65) Prior Publication Data
US 2008/0269007 A1 Oct. 30, 2008

(30) Foreign Application Priority Data
Sep. 6, 2005 (GB) .................................. 0518026.0

(51) Int. Cl.
*F16H 57/08* (2006.01)
(52) U.S. Cl. .................... 475/347; 475/345; 475/348
(58) Field of Classification Search .......... 475/344–348
See application file for complete search history.

(56) References Cited

U.S. PATENT DOCUMENTS

| 1,586,309 | A |   | 5/1926 | Hult |  |
|---|---|---|---|---|---|
| 3,303,713 | A |   | 2/1967 | Hicks |  |
| 4,674,360 | A |   | 6/1987 | Matoba |  |
| 5,368,528 | A | * | 11/1994 | Farrell | 475/348 |
| 5,558,594 | A |   | 9/1996 | Lefranc et al. |  |
| 6,017,289 | A | * | 1/2000 | Gaffney | 475/346 |
| 6,402,654 | B1 | * | 6/2002 | Lanzon et al. | 475/204 |
| 6,910,453 | B2 | * | 6/2005 | Sugino et al. | 123/179.28 |
| 7,097,585 | B2 | * | 8/2006 | Nishiji | 475/248 |
| 7,229,379 | B2 | * | 6/2007 | Antonov et al. | 475/258 |
| 2004/0235604 | A1 |   | 11/2004 | Fox |  |

FOREIGN PATENT DOCUMENTS

| DE | 4216397 | 11/1993 |
| GB | 1053412 | 1/1967 |
| GB | 1101132 | 1/1968 |
| GB | 1 558 033 | 12/1979 |

* cited by examiner

*Primary Examiner* — Ha D. Ho
(74) *Attorney, Agent, or Firm* — King & Schickli, PLLC

(57) ABSTRACT

The present epicyclic gear includes a carrier (12), a generally central sun gear (11), an outer annular gear (13) and an intermediary helical planet gear (14) which is mounted on the carrier (12) by a flexible pin assembly (15). The gear further includes a reaction member in the form of a rolling ring (22) at each axial end of the helical planet gear (14) to provide a respective radially inward reaction load onto the planet gear (14) in a sense that the reaction members (22) together resist a twisting moment on the planet gear (14) arising from the tooth loads on that gear.

6 Claims, 1 Drawing Sheet

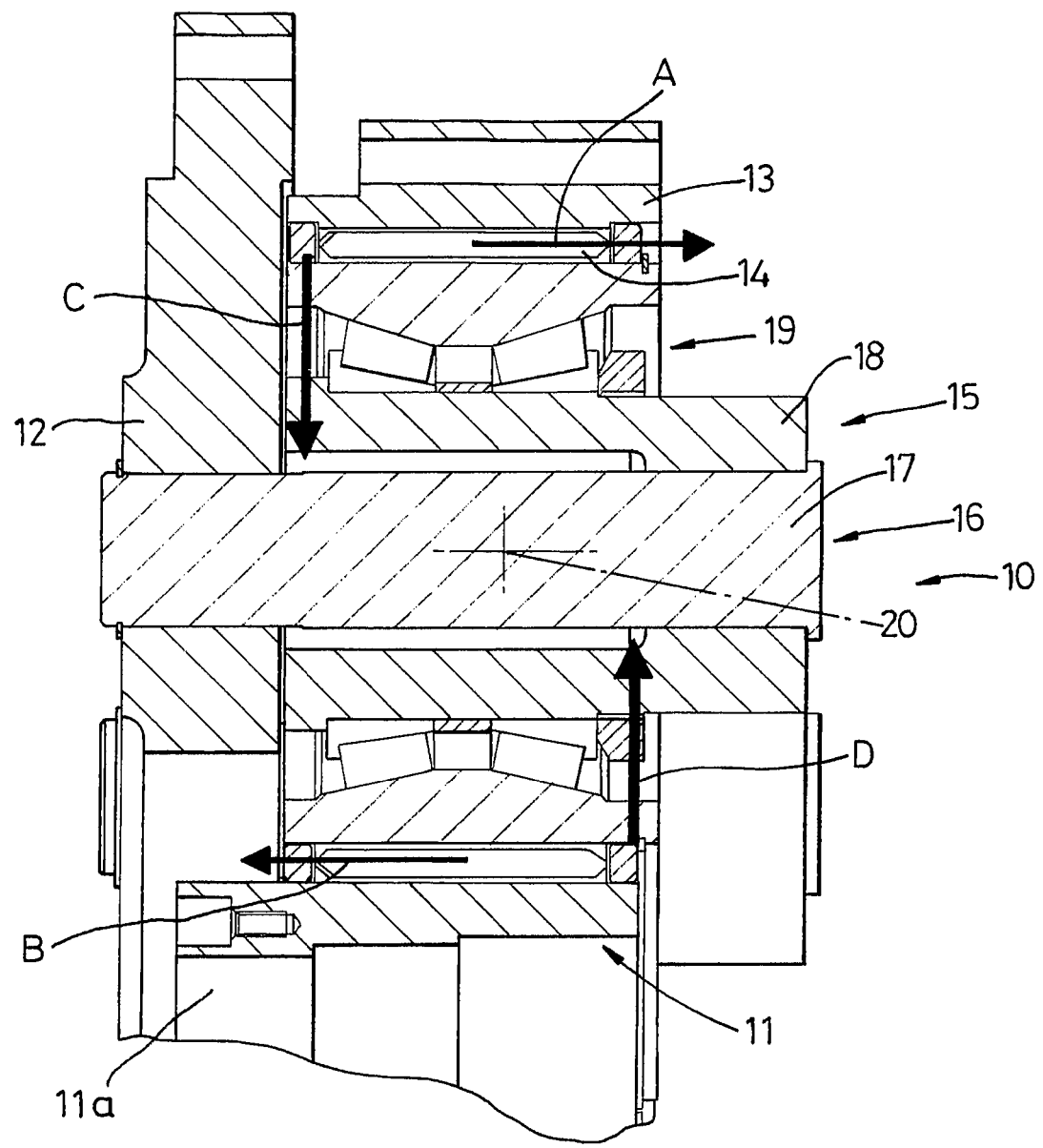

PLANETARY GEAR SET

FIELD OF THE INVENTION

This invention relates to epicyclic gears having a carrier, a generally central sun gear, an outer annular gear and a number of intermediary helical planet gears mounted on the carrier by a flexible pin or pin assembly.

BACKGROUND OF THE INVENTION

There can be a need to use helical gears on flexible pins in the type of arrangement described above. However, such an arrangement is problematic because resultant helical thrust loads are created in a sense which seek to twist the flexible pin about its centroid in a manner which would cause a misdistribution of load across the tooth contact face which could lead to the tooth breaking.

SUMMARY OF THE INVENTION

From one aspect the invention consists in a gear having a carrier, a generally central sun gear mountable on a shaft, and outer annular gear and an intermediary helical planet gear mountable on a shaft by flexible pin assembly characterised in that the gear further includes a reaction member in the form of a rolling ring at each end of the helical planet gear for each reaction member to provide a respective radially inward reaction load onto the flexible pin assembly in a sense to together resist a twisting moment on the planet gear arising from the tooth loads on the helical gear.

The pin is preferably cantilevered on the carrier and the reaction loads react in opposite senses about the centroid of the cantilever portion of the pin.

The helical gear may be mounted on the pin by a suitable bearing and each reaction load may act through the body of the helical planet wheel to balance the helical thrust moment. The diameter of the ring is preferably dimensioned to be just greater than the pitch circle of the helical gear to minimise its sliding velocity.

Although the invention has been defined by if it is to be understood it includes any inventive combination of the features set out above or in the following description.

The invention may be performed in various ways and a specific embodiment will now be described with reference to the accompanying drawing, which is a vertical section through one portion of an epicyclic gear.

DETAILED DESCRIPTION OF THE INVENTION

The gear, generally indicated in 10, includes a sun gear 11 centrally mounted on shaft 11a a carrier 12, an outer annular gear 13 and an intermediary helical gear 14, which is mounted on the carrier 12 a flexible pin assembly 15. The last comprises a flexible pin 16, which incorporates a central pin 17, and an outer sleeve 18, in a manner known to a man skilled in the art, and a bearing assembly 19.

Torque applied to the drive shaft 11a will tend to cause helical loading in the helical gear 14 in the sense indicated by the arrows A and B. These opposed loads create a twisting moment about the centroid 20 of the cantilevered portion of the pin assembly 16, which can cause the pin assembly 16 to deflect and in turn result in misdistribution of load across the tooth face width.

The applicants have realised that they can protect against such misdistribution by inserting rolling rings 22 at opposite ends of the helical gear 14. These rings 21 generate radially inwardly opposed reaction loads, indicated by the arrows C and D at the respective ends of the helical gear 14 and it will be appreciated that these will resist the twisting moment induced by the arrows A and B. The presence of the rings accordingly balances the helical tipping moment on the pin assembly 16.

The invention claimed is:

1. A gear having a carrier, a generally central sun gear mountable on a shaft, an outer annular gear and an intermediary helical planet gear mounted on the carrier by a flexible pin assembly characterised in that the gear further includes a reaction member in the form of a rolling ring at each end of the helical planet gear for each reaction member to provide a respective radially inward reaction load onto the planet gear in a sense together resist a twisting moment on the planet gear arising from the tooth loads on the helical gear.

2. The gear as claimed in claim 1 wherein at least a portion of the pin assembly is cantilevered on the carrier and the reaction loads act in opposite senses about the centroid of the cantilever portion of the pin assembly.

3. The gear as claimed in claim 1 wherein the pitch circle of the rolling rings is dimensioned to be just greater than the pitch circle of the helical gear.

4. The gear as claimed in claim 1 wherein the helical gear is mounted on the pin assembly by a bearing and each reactive load acts through the planet gear.

5. The gear of claim 1, wherein the flexible pin assembly includes a central pin and an outer sleeve.

6. The gear of claim 1, wherein the one rolling ring is placed at each axial end of the helical planet gear and contacts said helical planet gear on at least one radially outer surface of the helical planet gear.

* * * * *